(12) United States Patent
Michniewicz et al.

(10) Patent No.: US 10,022,670 B2
(45) Date of Patent: Jul. 17, 2018

(54) VEHICLE AIR SUPPLY SYSTEM

(71) Applicant: DR. SCHNEIDER AUTOMOTIVE POLSKA SPÓLKA Z ORGANICZONA ODPOWIEDZI-ALNOŚCIA, Janowice Wielkie (PL)

(72) Inventors: Daniel Michniewicz, Jeżów Sudecki (PL); Aleksandra Dudycz, Olawa (PL); Maciej Zawiślak, Bielany Wroclawskie (PL); Jacek Lis, Stronie Śla̧skie (PL); Aleksander Górniak, Stronie Śla̧skie (PL); Anna Janicka, Wroclaw (PL)

(73) Assignee: DR. SCHNEIDER AUTOMOTIVE POLSKA SPÓLKA Z OGRANICZONA ODPOWIEDZI-ALNOŚCIA, Janowice Wielkie (PL)

( * ) Notice: Subject to any disclaimer, the term of this patent is extended or adjusted under 35 U.S.C. 154(b) by 0 days.

(21) Appl. No.: 15/538,991

(22) PCT Filed: Dec. 21, 2015

(86) PCT No.: PCT/PL2015/050072
§ 371 (c)(1),
(2) Date: Jun. 22, 2017

(87) PCT Pub. No.: WO2016/105224
PCT Pub. Date: Jun. 30, 2016

(65) Prior Publication Data
US 2017/0354928 A1   Dec. 14, 2017

(30) Foreign Application Priority Data

Dec. 23, 2014 (PL) .................................. P.410774
Dec. 8, 2015 (PL) .................................. P.415183

(51) Int. Cl.
B01D 53/88    (2006.01)
B60H 3/06     (2006.01)
B01D 46/00    (2006.01)

(52) U.S. Cl.
CPC ........... B01D 53/88 (2013.01); B60H 3/0608 (2013.01); B01D 46/00 (2013.01);
(Continued)

(58) Field of Classification Search
CPC .............................. B01D 53/88; B60H 3/0608
See application file for complete search history.

(56) References Cited

U.S. PATENT DOCUMENTS 5,919,422 A      7/1999 Yamanaka et al.
6,468,491 B1 *  10/2002 Foury ..................... B60H 3/06
                                                    180/90
(Continued)

FOREIGN PATENT DOCUMENTS

DE    102009048121 A1    4/2011
FR         2797812 A1    3/2001
(Continued)

OTHER PUBLICATIONS

International Search Report, Application No. PCT/PL2015/050072, dated Apr. 6, 2016, 3 pages.
(Continued)

Primary Examiner — Regina M Yoo
(74) Attorney, Agent, or Firm — Ziegler IP Law Group, LLC

(57) ABSTRACT

A vehicle air supply system, in particular in automotive vehicles. The essence of the air supply system according to the vehicle air supply system is that inside the system there is a photocatalyst between at least one air intake (1,2) and at least one supply port (5). The photocatalyst may be deposited on inner surfaces of at least one element selected from
(Continued)

the group including vehicle's ventilation/air conditioning system (3), inlet ducts (4), supply ports (5), dampers (7) and filters (9). Preferably, the photocatalyst is given in the form of a bypass (6) or an insert (10) or an adapter (8).

15 Claims, 4 Drawing Sheets

(52) U.S. Cl.
CPC ............... *B01D 2255/2025* (2013.01); *B01D 2255/802* (2013.01); *B60H 2003/0675* (2013.01)

(56) References Cited

U.S. PATENT DOCUMENTS

| | | | |
|---|---|---|---|
| 7,251,953 B2* | 8/2007 | Wetzel | ............... F24F 1/025 454/233 |
| 7,582,256 B1 | 9/2009 | Geron et al. | |
| 2003/0024254 A1* | 2/2003 | Yoshida | ............... F25D 17/042 62/78 |
| 2004/0200228 A1* | 10/2004 | Yanagimachi | ..... B60H 1/00742 62/180 |
| 2005/0129591 A1 | 6/2005 | Wei et al. | |
| 2009/0010801 A1 | 1/2009 | Murphy et al. | |
| 2009/0098014 A1* | 4/2009 | Longstaff | ................ A61L 9/205 422/4 |
| 2012/0180998 A1 | 7/2012 | Nishioka et al. | |

FOREIGN PATENT DOCUMENTS

| | | | | |
|---|---|---|---|---|
| FR | 2838379 | A1 | 10/2003 | |
| JP | 04305228 | * | 10/1992 | ............. B01D 53/36 |
| JP | H05104946 | A | 4/1993 | |
| JP | 11-192942 | * | 7/1999 | ............. B61D 27/00 |
| PL | 207010 | A1 | 6/1979 | |
| PL | 399472 | A1 | 12/2012 | |
| PL | 399933 | A1 | 1/2014 | |
| WO | 2014011063 | A1 | 1/2014 | |

OTHER PUBLICATIONS

International Preliminary Report on Patentability, Application No. PCT/PL2015/050072, dated Sep. 19, 2016, 21 pages.

* cited by examiner

VEHICLE AIR SUPPLY SYSTEM

BACKGROUND

Field of the Invention

The invention relates to a vehicle air supply system, in particular in automotive vehicles.

Description of Related Art

An air supply port has been disclosed in Polish patent application no. P.399472. This known air supply port features inner surfaces of structural components, in particular those of a connector pipe, between the fan and the inlet opening, are covered with a catalytic material coating with catalytic properties for conversion reactions of hydrocarbons contained in the air passing through the ports. The air supply port is designed for an air supply system in automotive vehicles, vehicles for different purposes, working machinery and rooms.

An air treatment unit and an air treatment unit system have been disclosed in Polish patent application no. P.399933. The unit is equipped with a sensor for the pressure inside the duct and/or a sensor for the airflow through the duct, wherein the sensor or sensing unit is connected to the control system of the devices forcing the airflow. The unit purifies the air being passed from toxins and/or pollution and protects the ductwork from energetic losses necessary to overcome the resistance presented by filters installed at the outlets and/or the occurrence of an excessive pressure due to the installation of the filters, which may result in the damage to the ducts due to persistence of a specified level of pressure inside the duct.

A system used for air purification as disclosed in Polish patent description no. PL207010 has a control system of the purifying system, equipped with an air return duct, an air supply duct, a blower circulating the air in the system and a device purifying the air in the system, featuring at least one bedding coated with a catalyst, with which the air being circulated comes into contact, and at least one ultraviolet lamp located close to the bedding in order to light the bedding so as to oxidise organic compounds in the air being circulated. The control system includes input devices to signal the state of the room being conditioned and generate a request signal representing that state, and an element for modulation of operation of the said purifying device in response to the said request signal.

A modular photocatalytic device for air purification, a fan coil unit and the operating manner of the fan coil unit have been disclosed in Polish patent description no. PL207010. The device has a modular enclosure with a position restoring mechanism. The position restoring mechanism is designed to relocate the modular enclosure between the working position, set according to the fan coil unit, and the restored position. The modular enclosure accommodates many bracing structures, each of which features a deposited catalytic coating. At least one ultraviolet lamp is located between these numerous bracing structures. The position restoring mechanism comprises a structure of hinged doors, the structure being restored to ensure access to the modular photocatalytic device for air purifying and an arm supporting the modular enclosure in the working position, the arm being detachable when the enclosure is in the restored position. The catalytic coating is made of titanium dioxide.

An air purification device, which has been disclosed in US patent description no. U.S. Pat. No. 7,582,256, is provided in the form of a wall with an external steel structure, an opening for the admission of the air inside the metal framework to which a plurality of UVA lamps, a photocatalytic filter and an opening for discharging the purified air are fixed. The device comprises the photocatalytic filter for at least one metal grating covered with a film containing titanium dioxide ($TiO_2$), mainly in the anatase phase, in order to maximise the surface of the photocatalyst illuminated by the UVA light.

An apparatus and method for cleaning have been disclosed in US patent application no. US2009010801. The apparatus includes a housing that defines an airflow pathway and a catalytic reactor having a catalyst secured on a porous substrate that is disposed transverse to the airflow pathway. The catalyst is activated by light or thermally. The catalytic rector comprises a light source directed at the catalyst in the form of particles of the oxide selected from a group including $TiO_2/SiO_2$, $TiO_2$, $ZrO_2$, $TiO_2/SnO_2$, $TiO_2/TiO_2/WO_3$, $TiO_2$, $MoO_3/V_2O_5$, as well as any combination thereof. The catalyst may also contain metal particles located on catalytic particles in an amount of 0.01 wt % to 5 wt %. Also, the apparatus comprises an adsorption matrix upstream of the catalytic reactor, optionally in combination with a heater, and may have a solid particle filter and/or electrostatic precipitator located upstream of the adsorption matrix and the catalytic reactor.

Yet French patent application no. FR2797812 discloses a manner of air purification in a vehicle's passenger compartment, equipped with at least one element selected from a group composed of heating, ventilation and air conditioning located beneath the vehicle's dashboard. The method consists in depositing a photocatalytic layer on the surface of the dashboard provided with vents and exposing the layer to visible or ultraviolet light.

Another French patent application no. FR2838379 discloses a unit for air purification in a passenger compartment, equipped with an air conditioning system composed of an evaporator featuring cocurrent and countercurrent surface. The surface downstream of the evaporator holds a photocatalytic agent and a light source to which the surface is exposed. Whereas a particle filter and an ionizer are located upstream of the evaporator.

A disadvantage of the solutions applied in the current state-of-art is none or low effectiveness of reduction of harmful volatiles which reach the passenger compartment.

SUMMARY OF THE INVENTION

The purpose of the invention is to provide a solution which would eliminate the disadvantage and provide air quality improvement inside the passenger compartment.

The essence of the air supply system according to the invention is that inside the system there is a photocatalyst between at least one air intake and at least one supply port. The system further comprises a bypass with the photocatalyst located on it. The bypass is tied in at least one element selected from the group including the vehicle's ventilation/air conditioning system, the inlet ducts, the supply ports, the dampers and the filters. The bypass is further equipped with means of disturbing a flow of air stream, said means create a network of ducts formed by a system of ribs and/or plates such that the time of exposure of the air stream to the photocatalyst is extended allowing for better mixing of the polluted air and time required for a photocatalytic process to reduce toxins.

Preferably, inside the bypass an insert is placed.

The photocatalyst is preferably deposited on the inner surfaces of at least one element selected from the group containing the vehicle ventilation/air conditioning system, supply ducts, supply ports, dampers, filters.

Preferably, the photocatalyst is deposited on the bypass's inserts made as ceramic, metal, glass or plastic inserts.

Preferably, the bypass is fitted with an optical system, which focuses or disperses the lightning on the device's surface.

Preferably, the photocatalyst is given in the form of a layer of metal oxide nanopowder as well as the combination selected from the group of $CuO$, $Co_3O_4$, $CoO_x$, $NiO$, $MnO_x$, $MnO_2$, $MoO_3$, $ZnO$, $Fe_2O_3$, $WO_3$, $TiO_2$, $Al_2O_3$, $CeO_2$, $V_2O_5$, $ZrO_2$, $HfO_2$, $Dy_2O_3$, $Cr_2O_3$, $Nb_2O_5$; alternatively, selected from the group of Pt, Pd and Rh.

Preferably, the photocatalyst is given in the form of a nanopowder layer of lithium niobate ($LiNbO_3$).

Preferably, for the purpose of the light source illuminating the surface with the deposited photocatalyst, there may be an ultraviolet light given as LEDs or a LED lamp, a fibre-optic cable, a cathodic light, an ultraviolet laser or their combination.

Preferably, the bypass uses LEDs in the SMD mount technology, with the wavelength $\lambda$ in the range from 240 nm to 415 nm and the Gaussian distribution of radiation, with the bypass equipped with a transparent optical collimator system featuring an illumination angle of 130°, mounted inside and/or outside the reactor.

Preferably, the bypass houses LEDs in the through-hole technology, with the wavelength $\lambda$ in the range from 240 nm to 415 nm, with the reactor equipped with an integrated transparent optical system featuring an illumination angle of 30°, mounted inside and/or outside the reactor.

Preferably, the catalyst activation temperature is in range from 120° C. to 500° C.

Preferably, the system is equipped with an automatic control system for the airflow between the system's inputs and outputs. More specifically, the system is fitted with the dampers for controlling the airflow between the system and the bypass.

The vehicle air supply system effectively reduces organic volatiles in the vehicle's compartment air, resulting in neutral compounds, also including bacteria, viruses and fungi, and as such it improves quality of the air inside the vehicle's compartment.

In contrast to the known state-of-the-art solutions, the application of the system according to the invention effectively reduces impurities in the vehicle's compartment air owing to the provision of proper mixing of the polluted air and the time required for the photocatalytic process to reduce toxins. In particular, the application of the reactor allows for the reduction of harmful substances such as BTX (benzene, toluene and xylenes), which may reach the vehicle's compartment together with the polluted air. Additionally, the presented solution of the air supply system allows for the reduction of microbiological contamination (viruses, bacteria, fungi and other).

The application of a network of ducts and inserts, which disturb the airflow with minimum pressure losses, ensures proper mixing of the polluted air and extension of the time of exposure to the catalytic material, ensuring favourable properties of gas (air) purification, as proven by laboratory tests.

BRIEF DESCRIPTION OF THE DRAWINGS

The subject of the invention in the example of embodiment is disclosed in the drawing, wherein.

DETAILED DESCRIPTION OF THE INVENTION

Embodiment 1

Figure 1:
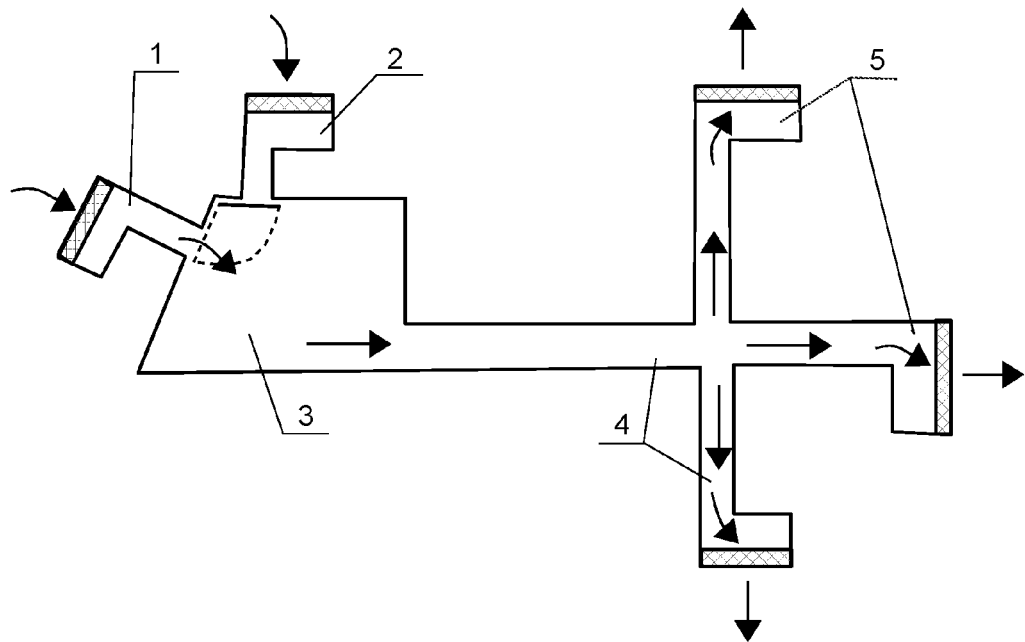
FIG. 1 is the vehicle air supply system with a photocatalyst deposited on inner surfaces of supply ports and ducts which supply air to the vehicle compartment, FIG. 2—the vehicle air supply system with a bypass covered with the photocatalyst, FIG. 3—the vehicle air supply system equipped with an additional adapter covered with the photocatalyst, FIG. 4—the vehicle air supply system equipped with filters covered with the photocatalyst, FIG. 5—the vehicle air supply system with photocatalyst-covered dampers which control the airflow, FIG. 6—the vehicle air supply system equipped with photocatalyst-covered inserts, FIG. 7—the vehicle air supply system equipped with ducts controlling and disturbing the airflow.
Figure 2:
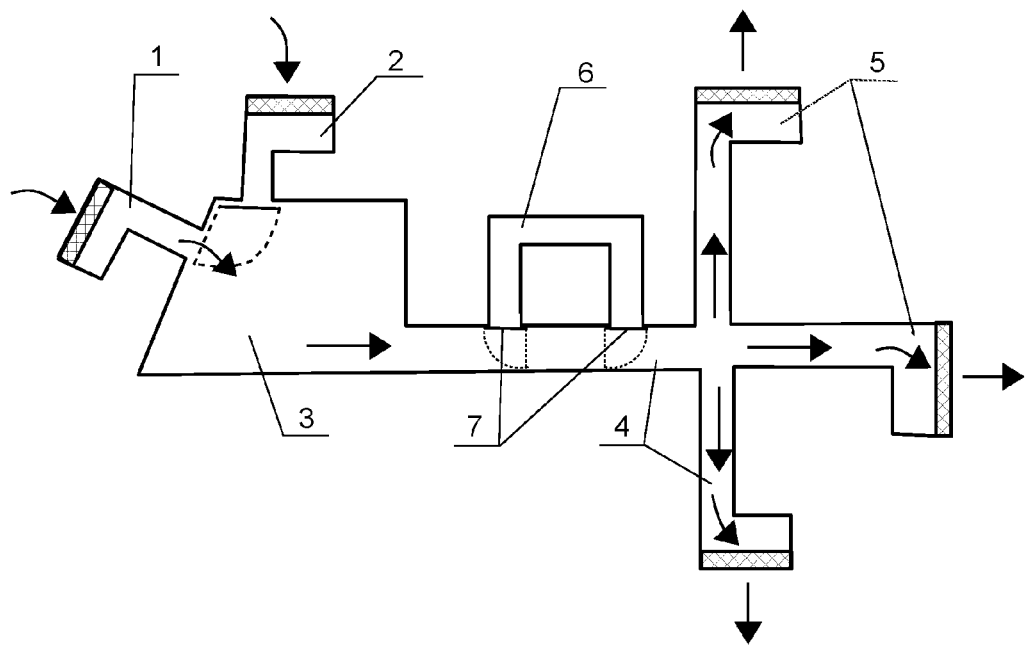
Figure 3:
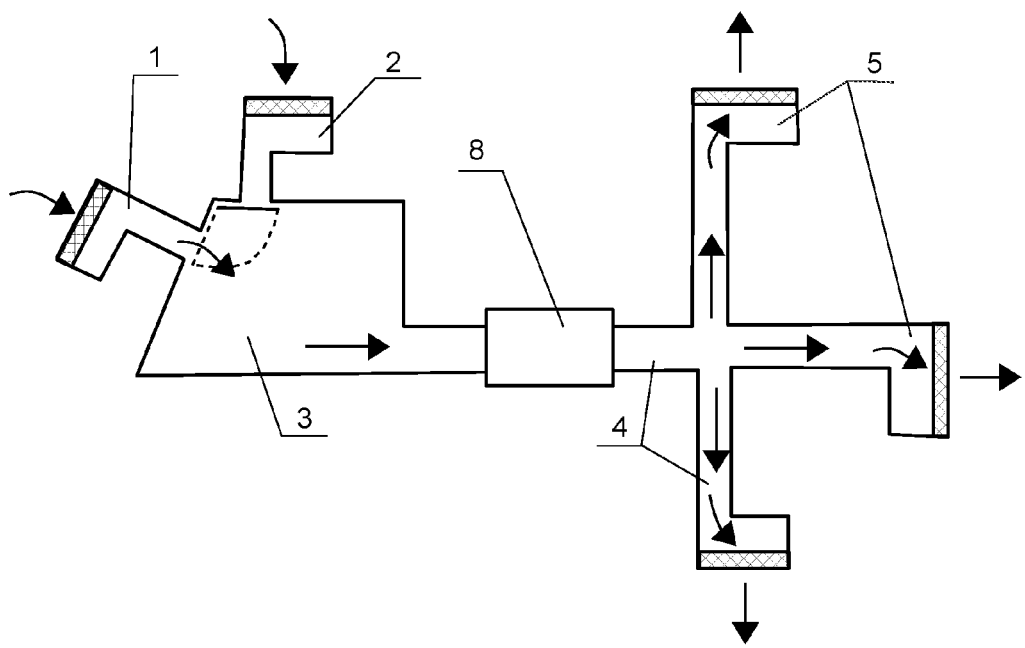
Figure 4:
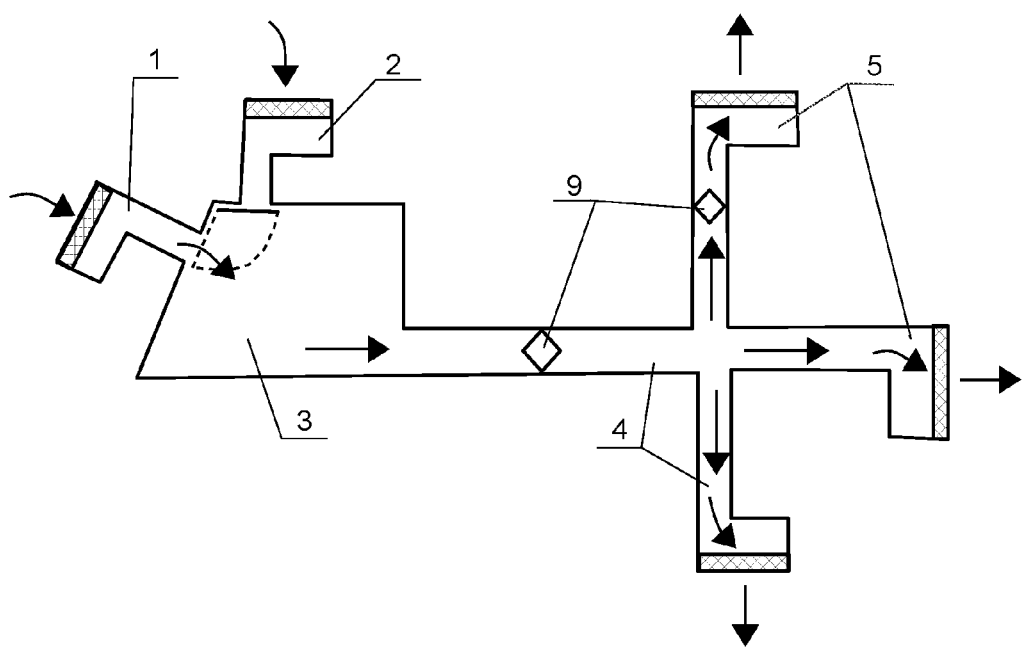
Figure 5:
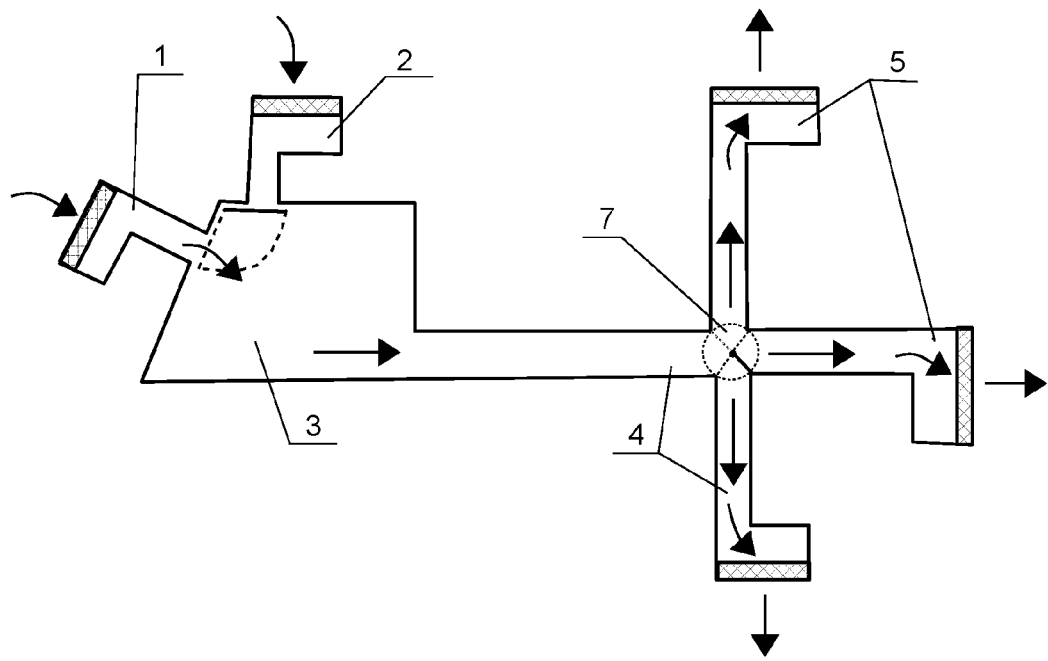
Figure 6:
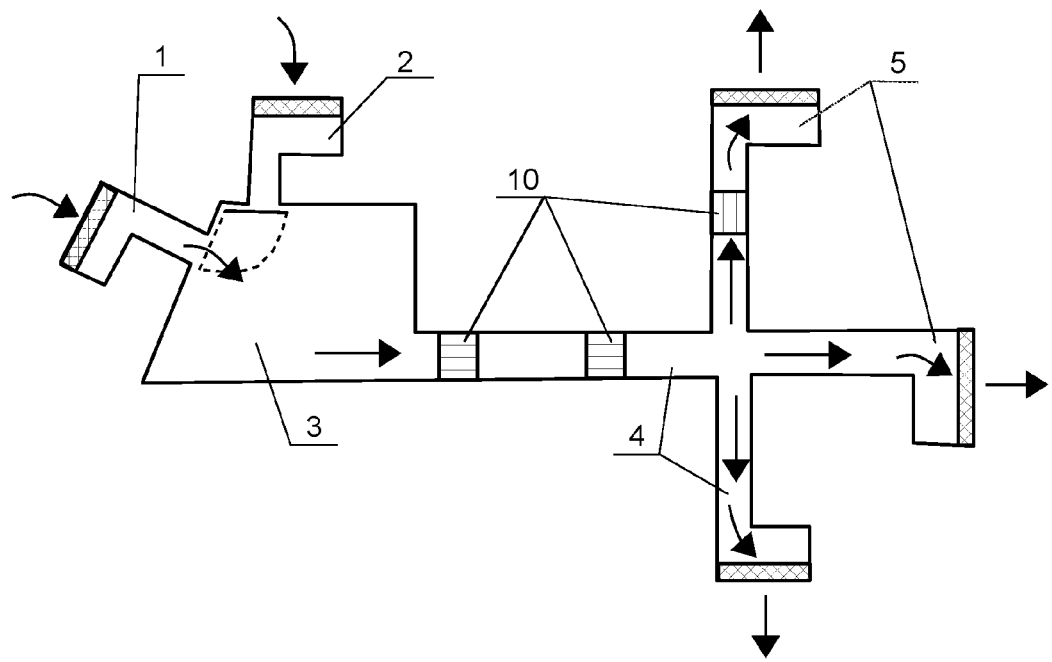
Figure 7:
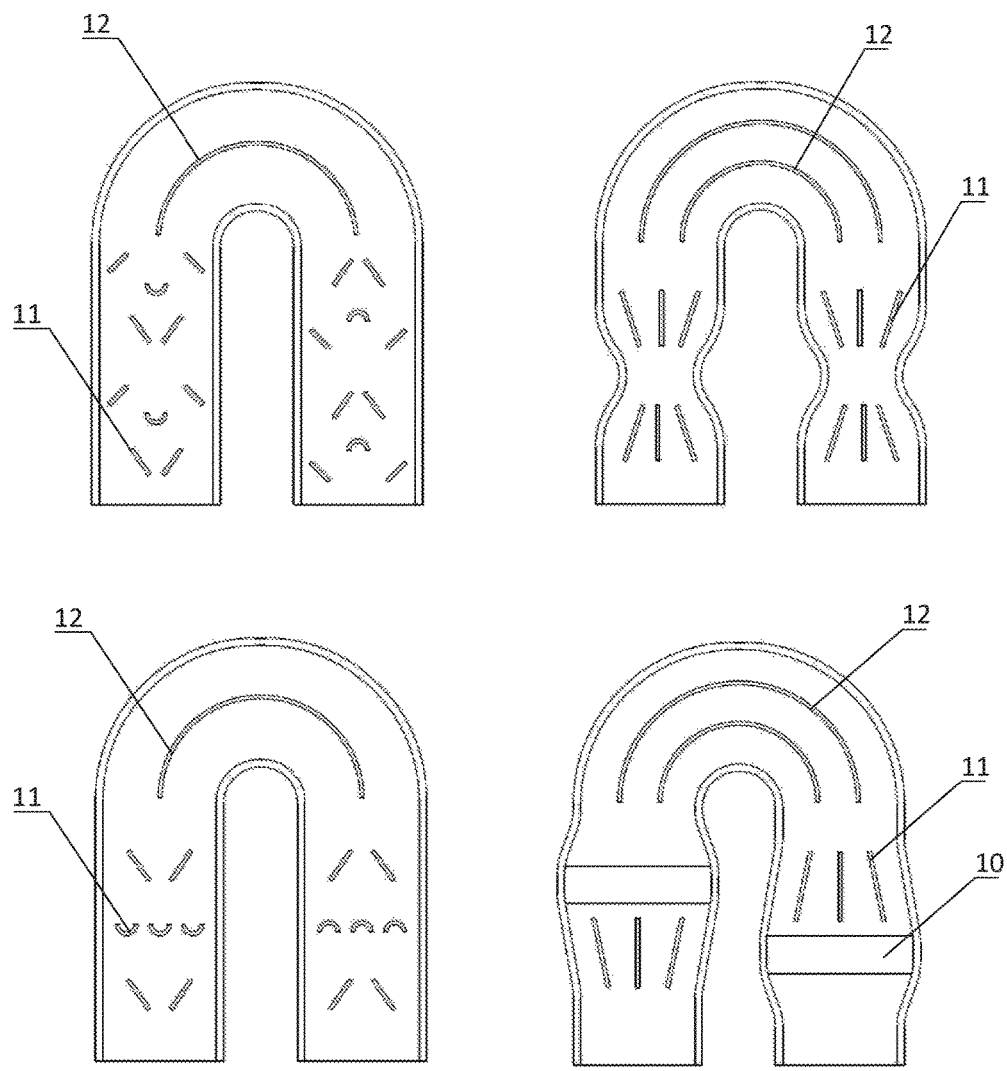

The vehicle air supply system has air intake 1 and recirculation air intake 2, connected by means of ventilation/air conditioning system 3 by inlet ducts 4 with supply ports 5. There is the photocatalyst between air intake 1, 2 and supply ports 5, the photocatalyst being presented in every embodiment as a light source, such as an ultraviolet light in the form of LEDs or a LED lamp, a fibre-optic cable, a cathodic light, an ultraviolet laser or their combinations.

Embodiment 2

The vehicle air supply system has air intake 1 and recirculation air intake 2, connected by means of ventilation/air conditioning system 3 by inlet ducts 4 with supply ports 5. Bypass 6, which is covered with the photocatalyst, is located downstream of ventilation/air conditioning system 3 in the supply duct 4.

Embodiment 3

The vehicle air supply system has air intake 1 and recirculation air intake 2, connected by means of ventilation/air conditioning system 3 by inlet ducts 4 with supply ports 5. Additional adapter 8, which is covered with the photocatalyst, is located downstream of the ventilation/air conditioning system 3 in the supply duct 4.

Embodiment 4

The system presented in embodiment 2 or 3, wherein the reactor constitutes bypass 6 or adapter 8, equipped with a network of disturbing ducts 11 and control ducts 12 of the airflow, created by the system of airflow disturbing elements, i.e. a system of ribs or systems of plates. Additionally, the reactor has inserts 10 with the deposited photocatalyst, made as ceramic, metal, glass or plastic inserts. Alternatively, the reactor is fitted with an optical system, which focuses or disperses lightning on the device's surfaces.

In one of practical embodiments, the inside of the reactor accommodates LEDs in the SMD mount technology, with the wavelength $\lambda$ in the range from 240 nm to 415 nm and the Gaussian distribution of radiation, with the reactor being equipped with a transparent optical collimator system featuring an illumination angle of 130°.

In another embodiment of the invention, the reactor houses LEDs in the through-hole technology, featuring the wavelength λ in the range from 240 nm to 415 nm, with the reactor being equipped with an integrated transparent optical system featuring an illumination angle of 30°.

Embodiment 5

The vehicle air supply system has air intake 1 and recirculation air intake 2, connected by means of ventilation/air conditioning system 3 by inlet ducts 4 with supply ports 5. Filters 9 covered with the photocatalyst are mounted downstream of ventilation/air conditioning system 3 in inlet duct 4, and therefore the current function of the filters has been supplemented with a new function which consists in photocatalysis-based air purification.

Embodiment 6

The vehicle air supply system has air intake 1 and recirculation air intake 2, connected by means of ventilation/air conditioning system 3 by inlet ducts 4 with supply ports 5. There are dampers 7 controlling the airflow, the same being covered with the photocatalyst, in inlet ducts 4.

Embodiment 7

The vehicle air supply system has air intake 1 and recirculation air intake 2, connected by means of ventilation/air conditioning system 3 by inlet ducts 4 with supply ports 5. Photocatalyst-covered inserts 10 are mounted in inlet ducts 4.

Embodiment 8

The vehicle air supply system as in embodiments one to six, with the difference being that the photocatalyst is given in the form of titanium dioxide ($TiO_2$) nanopowder.

Embodiment 9

The vehicle air supply system made as in embodiments one to six, with the difference being that the photocatalyst is given in the form of lithium niobate ($LiNbO_3$) nanopowder.

The catalyst or photocatalyst layer can comprise oxides of metals which are active during CO combustion and organic volatiles; such oxides include $CuO$, $Co_3O_4$, $CoO_x$, $NiO$, $MnO_x$, $MnO_2$, $MoO_3$, $ZnO$, $Fe_2O_3$, $WO_3$, $CeO_2$, $TiO_2$, $Al_2O_3$, $V_2O_5$, $ZrO_2$, $HfO_2$, $Dy_2O_3$, $Cr_2O_3$ and $Nb_2O_5$. Also, for the purpose of the catalysts, single oxides of transition metals as well as mixed oxides can be used. The catalysts with oxides of transition metals are effective in both complete and selective oxidisation of organic volatiles. Their catalytic properties are particularly associated with the type of oxygen involved in the oxidisation process.

Catalytic oxidisation of organic volatiles on catalysts with noble metals is susceptible to their structure. The effect of Pt particle size on catalytic oxidisation of various hydrocarbons has been studied thoroughly; generally, larger Pt particles are more active. A smaller impact on catalytic effectiveness of Pt catalysts is exerted by factors such as the type of carrier (aluminium oxide or silica), porosity and acid-base properties of the carrier. Addition of $Co_3O_4$, $CeO_2$, $La^{3+}/Bi^{3+}$ promoters added to $CeO_2$—$ZrO_2$ results in an increase of activity and thermal stability of Pt and Pd catalysts based on aluminium oxide as used for emission reduction of organic volatiles.

Noble metal-based catalysts, such as Pt and Pd, show a good effect at low temperatures in complete oxidisation of organic volatiles. The application of such catalysts to control organic volatiles in the industry is limited due to the catalysts' cost and sensitivity to poisoning, in particular chlorine and chlorine derivatives. Cerium oxide prepared by the means of combustion, precipitation or thermal decomposition is very active while combusting organic volatiles, due to its ability of oxygen accumulation. Oxidisation of organic volatiles to $CeO_2$ is an example of the process based on the Redox mechanism, in which the supply of oxygen from easily reducible oxide and its re-oxidisation by oxygen is the key stage. The modification of $CeO_2$ with other metal oxides, e.g. by partial replacement of $Ce^{4+}$ by $Zr^{4+}$ ions in the lattice network (mixed Ce—Zr oxides), may improve the catalyst's oxygen capacity and thermal resistance as well as increase catalytic activity at low temperatures. An advantage of manganese-based catalysts is the high activity relating to all oxidisation reactions, low cost and low toxicity. Catalysts featuring the perovskite structure demonstrate easiness with changes of Redox properties. The multi-valent nature of $MnO_x$ is the reason for which such oxides are a promising candidate in the catalytic oxidisation of organic volatiles, and similarly to the case of cerium oxide, their effectiveness is aided by the additive of other transition metal oxides, such as Ce, Zr and Cu; in some cases, the activity is comparable to, or better than that with catalysts based on noble metals. Very good catalytic qualities are also shown by perovskite structures with the general formula of $ABO_3$, where: A is the rare-earth element, B is the transition metal, due to the activity being comparable to that in catalysts with noble metals in oxidisation reactions, but with the cost of synthesis being considerably lower. The most effective structures of these type include perovskites containing cobalt and manganese, irrespective of rare-earth elements.

Catalytic activity depends on the type of noble metal and changes with respect to the nature of organic volatiles: alkanes, alkenes and aromatic hydrocarbons. Pt and Pd on aluminium oxides are highly active when oxidising benzene and butanol; however, it is more difficult to oxidise ethyl acetate, wherein Pd acts better compared with Pt. Results of the research on oxidisation of benzene, toluene and 1-hexene (single and mixtures with isooctane and CO) using Pt, Pd and Rh/$Al_2O_3$ catalysts deposited on cardierite monoliths have shown that each of the catalysts demonstrates a different activity depending on whether oxidisation applies to a mixture of hydrocarbons or each component individually. Metals show another sequence of activity with reference to single reactions under conditions of excessive oxygen. The greatest difference is shown by Rh, which is the most active one during oxidisation of hexane and the least active one while oxidising aromatic hydrocarbons. Pt is the most effective one while oxidising benzene, and Pd-toluene. The presence of CO in the mixture considerably inhibits reactions to Pt, to a lower extent to Pd, slightly simulating a process of Rh catalysis, with the sequence of catalyst activity in the presence of CO being Rh>Pd>Pt. Various activity trends of the studied noble metals are explained by forces of adsorption-desorption processes of reagents on the surface of these metals. The use of noble metals, in particular Pt and Pd dispersed in the form of powders on a well-developed γ-$Al_2O_3$ surface, or in the form of layers on monolithic carriers, is favourable due to the better activity, resistance to deactivation and ability to regenerate. Generally, even though Pd is more effective while oxidising ethyl acetate and toluene, Pt is preferable.

What is claimed is:

1. A vehicle air supply system comprising inlet ducts, filters, dampers, outlet ports, a light source and a photocatalyst between at least one air intake and at least one supply port inside the vehicle air supply system wherein the photocatalyst is located on a bypass (6) tied into at least one element selected from the group including the vehicle's ventilation/air conditioning system (3), the inlet ducts (4), the at least one supply port (5), the dampers (7) and the filters (9), wherein the bypass (6) is equipped with means of disturbing a flow of air stream, said means of disturbing a flow of air stream comprising a network of ducts formed by a system of ribs and/or plates (11, 12) such that a time of exposure of the air stream to the photocatalyst is extended allowing for better mixing of polluted air in a photocatalytic process to reduce toxins.

2. The vehicle air supply system according to claim 1, further comprising an insert placed inside the bypass (6).

3. The vehicle air supply system according to claim 1, wherein the photocatalyst is deposited on inner surfaces of the at least one element.

4. The vehicle air supply system according to claim 1, wherein the photocatalyst is deposited on inserts (10) of the bypass, the inserts comprising ceramic, metal, glass or plastic inserts.

5. The vehicle air supply system according to claim 1, wherein the bypass (6) is fitted with an optical system, which focuses or disperses light on a surface of the bypass.

6. The vehicle air supply system according to claim 1, wherein the photocatalyst comprises a layer of metal oxide nanopowder, the layer of metal oxide nanopowder being selected from a group of oxides comprising $CuO$, $Co_3O_4$, $CoO_x$, $NiO$, $MnO_x$, $MnO_2$, $MoO_3$, $ZnO$, $Fe_2O_3$, $WO_3$, $TiO_2$, $Al_2O_3$, $CeO_2$, $V_2O_5$, $ZrO_2$, $HfO_2$, $Dy_2O_3$, $Cr_2O_3$, $Nb_2O_5$.

7. The vehicle air supply system according to claim 6, wherein the layer of metal oxide nanopowder further comprises an additive of noble metal nanopowder selected from the group of Pt, Pd and Rh.

8. The vehicle air supply system according to claim 1, wherein the photocatalyst comprises a layer of lithium niobate ($LiNbO_3$) nanopowder.

9. The vehicle air supply system according to claim 1, further comprising a light source configured to illuminate a surface of the bypass with a deposited photocatalyst, the light source comprising an ultraviolet light.

10. The vehicle air supply system according to claim 9, wherein the light source comprises one or more of LEDs, a LED lamp, a fibre-optic cable, a cathodic light, an ultraviolet laser, or a combination thereof.

11. The vehicle air supply system according to claim 1, wherein the bypass (6) comprises a reactor with surface-mount (SMD) LEDs, the LEDs having a wavelength $\lambda$ in a range from 240 nm to 415 nm and the Gaussian distribution of radiation, with the reactor equipped with a transparent optical collimator system featuring an illumination angle of 130°, mounted inside and/or outside the reactor.

12. The vehicle air supply system according to claim 1, wherein the bypass (6) comprising a reactor housing LEDs mounted using through-hole technology, with the wavelength $\lambda$ in the range from 240 nm to 415 nm, the reactor equipped with an integrated transparent optical system featuring an illumination angle of 30°, mounted inside and/or outside the reactor.

13. The vehicle air supply system according to claim 1, wherein an activation temperature of the photocatalyst ranges from 120° C. to 500° C.

14. The vehicle air supply system according to claim 1, wherein the vehicle air supply system is equipped with an automatic system controlling airflow between the at least one air intake and the at least one supply port.

15. The vehicle air supply system according to claim 1, wherein the vehicle air supply system is fitted with the dampers (7) for controlling airflow between the at least one air intake and the bypass (6).

\* \* \* \* \*